(12) United States Patent
Ragusa et al.

(10) Patent No.: US 9,892,343 B2
(45) Date of Patent: Feb. 13, 2018

(54) COMPUTER-IMPLEMENTED METHOD FOR CLASSIFICATION OF A PICTURE

(71) Applicant: STATLIFE, Villejuif (FR)

(72) Inventors: Stéphane Ragusa, Marnes la Coquette (FR); Valérie Helin, Paris (FR)

(73) Assignee: STATLIFE, Villejuif (FR)

( * ) Notice: Subject to any disclaimer, the term of this patent is extended or adjusted under 35 U.S.C. 154(b) by 69 days.

(21) Appl. No.: 14/906,981

(22) PCT Filed: Jul. 25, 2014

(86) PCT No.: PCT/EP2014/066091
§ 371 (c)(1),
(2) Date: Jan. 22, 2016

(87) PCT Pub. No.: WO2015/011280
PCT Pub. Date: Jan. 29, 2015

(65) Prior Publication Data
US 2016/0171345 A1    Jun. 16, 2016

(30) Foreign Application Priority Data

Jul. 25, 2013    (EP) .................................... 13306082

(51) Int. Cl.
*G06K 9/00* (2006.01)
*G06K 9/62* (2006.01)
*G06T 7/00* (2017.01)

(52) U.S. Cl.
CPC .......... *G06K 9/6276* (2013.01); *G06T 7/0014* (2013.01); *G06T 2207/10116* (2013.01); *G06T 2207/30068* (2013.01)

(58) Field of Classification Search
CPC ......... G06T 2207/30068; G06T 7/0012; G06T 2207/10116; G06T 2207/30096; G06T 7/11
(Continued)

(56) References Cited

U.S. PATENT DOCUMENTS

| 6,453,058 B1 * | 9/2002 | Murthy ................ G06K 9/6211 382/128 |
| 8,194,965 B2 * | 6/2012 | Lossev ................ G06K 9/6297 382/128 |

(Continued)

OTHER PUBLICATIONS

International Search Report for PCT/EP2014/066091 dated Sep. 10, 2014.
(Continued)

*Primary Examiner* — Charlotte M Baker
(74) *Attorney, Agent, or Firm* — Stephen J. Weyer, Esq.; Stites & Harbison, PLLC

(57) ABSTRACT

The present invention relates to a computer-implemented method for classification of a picture to be analyzed, by attribution of a grade thereto, comprising: a) determining the distance between the picture to be analyzed and pictures from a database of graded pictures; b) selecting from within the database of graded pictures a predetermined number of the closest neighboring pictures or neighboring pictures which are at a distance from the picture to be analyzed below a threshold; c) determining the mean of the grades of the selected neighboring pictures; d) attributing the mean grade to the picture to be analyzed; and e) displaying the mean grade attributed to the picture to be analyzed on an output device.

16 Claims, 2 Drawing Sheets

(58) Field of Classification Search
USPC ....... 382/128, 132, 224, 309; 378/37; 705/2; 600/300, 306
See application file for complete search history.

(56) References Cited

U.S. PATENT DOCUMENTS

| | | | | |
|---|---|---|---|---|
| 2004/0076345 | A1* | 4/2004 | Olszak | G06F 17/30855 382/309 |
| 2011/0013819 | A1* | 1/2011 | Raundahl | G06K 9/527 382/132 |

OTHER PUBLICATIONS

Narvaez Fabian et al: "Multi-view information fusion for automatic BI-RADS description of mammographic masses", Medical Imaging 2011: Computer-Aided Diagnosis, SPIE, 1000 20th St. Bellingham WA 98225-6705 USA, vol. 7963, No. 1, (Mar. 3, 2011), pp. 1-7.

Fabian Narvaez et al: "Automatic BI-RADS Description of Mammographic Masses" In: "Field Programmable Logic and Application", (Jan. 1, 2010), Springer Berlin Heidelberg, Berlin, Heidelberg, vol. 6136, pp. 673-681.

Isabelle Bloch: "Information Combination Operators for Data Fusion: A Comparative Review with Classification", IEEE Transactions on Systems, Man and Cybernetics. Part A:Systems and Humans, IEEE Service Center, Piscataway, NJ, US, vol. 26, No. 1, (Jan. 1, 1996), * abstract, p. 54, Fig. 2, eq. 34.

Cho Hyun-Chong et al: "Similarity evaluation in a content-based image retrieval (CBIR) CADx system for characterization of breast masses on ultrasound images", Medical Physics, AIP, Melville, NY, US, vol. 38, No. 4, (Mar. 10, 2011) pp. 1820-1831.

Wei Liu et al: "Mammographic Mass Retrieval Based on Multi-View Information", Bioinformatics and Biomedical Engineering, (ICBBE) 2011 5th International Conference on, IEEE, (05-10-201), pp. 1-4.

* cited by examiner

COMPUTER-IMPLEMENTED METHOD FOR CLASSIFICATION OF A PICTURE

FIELD OF THE INVENTION

The present invention relates to a computer-implemented method for classification of a picture to be analyzed, in particular a mammogram, by attribution of a grade, in particular a BI-RADS grade, thereto.

TECHNICAL BACKGROUND

The BI-RADS (Breast Imaging-Reporting and Data System) classification has been devised, in particular, by the American college of Radiology initially to standardize the reporting of the visual analysis of mammograms, i.e. X-Ray pictures of breasts, by radiologists in the frame of the assessment of breast cancer and breast cancer risk. The classification has then been extended to magnetic resonance imaging (MRI) and ultrasound pictures. Two types of categories are used, the assessment categories and the breast density categories.

The BI-RADS assessment categories are used to grade the pathological status of the breast being the subject of the mammogram:
0: Incomplete (the mammogram cannot be graded)
1: Negative (no tumor, either benign or malignant)
2: Benign finding
3: Probably benign
4: Suspicious abnormality
5: Highly suggestive of malignancy
6: Proven Malignancy (known from biopsy)

The BI-RADS breast density categories are used to evaluate the density of non pathogenic breasts:
1: Almost entirely fatty (i.e. non dense), which means that fibroglandular tissues make up less than 25% of the breast;
2: Scattered fibroglandular densities, which means that fibrous and glandular tissue makes up from 25 to 50% of the breast;
3: Heterogeneously dense, which means that the breast has more areas of fibrous and glandular tissue (from 51 to 75%) that are found throughout the breast;
4: Extremely dense, which means that the breast is made up of more than 75% fibroglandular tissue.

Variations in density from one breast to another are due to differences in fat/fibroglandular tissue proportions. Fatty tissues appear as non-dense areas in mammograms whereas fibroglandular tissues appear as dense areas. Mammographic density is thus a measure of the fibroglandular or non-fatty tissue of the mammogram. Various classifications, in addition to the BI-RADS classification, can be used for characterizing breast density. As such the classification of Wolfe uses 4 parenchymal patterns, N1: almost entirely fatty, P1 linear densities (enlarged galactophoric ducts) occupying no more than 25% of the breast, P2: linear densities (from enlarged galactophoric ducts) occupying more than 25% of the breast, and DY: dense, radiopaque breast. Percent dense area, or 2D percent density, defined as the ratio of the projected area of dense breast tissue divided by area of the entire breast, is a computerized method that is also used.

Mammographic density has been established as a key factor risk for breast cancer, with denser mammograms associated with an odds ratio of at least 4 for breast cancer, i.e. mammograms either graded 4 according to the BI-RADS classification of breast composition or DY according to the parenchymal pattern classification or having a percent density above 75%.

Although these classification methods yield somewhat similar results in terms of breast cancer prediction—percent dense area even yielding slightly better results—the BI-RADS classification is still today more widely used in clinical practice throughout the world because it is easier to determine and report.

This classification however suffers from one major drawback or bias, which is linked to the subjectivity of the method, i.e. it is strongly operator-dependant. In fact even agreement exhibited by individual radiologists vary widely with intra-radiologist percent agreement ranging from 62.1% to 87.4% (Spayne (2012) *Breast J.* 18:326-33). Moreover, there appears to be an overestimation of density by radiologists as compared to a computerized determination of density (Ciatto et al. (2012) *Breast* 21:503-506).

Computer-assisted classification methods have thus been developed in order to improve the reproducibility of mammogram grading according to the BI-RADS classification. In this regard, the Volpara Imaging software (Aitken et al. (2010) *Cancer Epidemiol. Biomarkers Prev.* 19:418-428) and the Hologic Quantra software (Ciatto et al. (2012) *Breast* 21:503-506) both analyze digital mammograms in a fully automated volumetric fashion and produce a quantitative assessment of breast composition, namely volume of fibroglandular tissue in cubic centimeters, volume of breast tissue in cubic centimeters, and their ratio (i.e. volumetric density or 3D percent density). However, these methods tend to under-evaluate breast density with respect to human classifying reader. As such, Ciatto et al. (2012) *Breast* 21:503-506 report that breast density assessed by computer using the Quantra software provided systematically lower percentage values as compared to visual classification.

It is thus an object of the present invention to provide a computer-based method to assist human operators, e.g. radiologists, in classifying mammograms according to the BI-RADS classification, which more accurately reflects visual classification assessed by experienced human classifying readers.

SUMMARY OF THE INVENTION

As such, the present invention in particular provides a computer-implemented or computer-assisted method for grading a mammogram according to the BI-RADS classification, based on the grading attributed by experienced human classifying readers to similar mammograms. Mammograms similar to the mammogram under study are computer-selected from within a database of graded mammograms for example on the basis of their global similarity or of their proximity as regards one or several parameters, such as 2D or 3D percent density. The mean grade of these neighboring mammograms is then used to grade the mammogram under study. This approach thus advantageously yields a grade which amounts to a consensus grade which would be attributed by several human classifying readers. Accordingly, the method of the computer-implemented method of the invention overcomes the under-evaluation of breast density performed by computer-assisted classification method of the art. Besides, the method of the invention may also rely on objective mammogram parameters, such as 2D or 3D percent density, which are used to select the neighboring mammograms. The approach of the invention is also advantageous in that it may yield a continuous density grade from 1 to 4, thereby bringing more information to the 4-categories BI-RADS density classification. This approach can also be readily extended to the study of other pictures, in particular in the medical field.

The present invention thus relates to a computer-implemented method for classification of a picture to be analyzed, by attribution of a grade thereto, comprising:
a) determining the distance between the picture to be analyzed and pictures from a database of graded pictures (step 10);
b) selecting from within the database of graded pictures a predetermined number of the closest neighboring pictures or neighboring pictures which are at a distance from the picture to be analyzed below a threshold (step 20);
c) determining the mean of the grades of the selected neighboring pictures (step 30);
d) attributing the mean grade to the picture to be analyzed (step 40); and
e) displaying the mean grade attributed to the picture to be analyzed on an output device (step 50).

In a particularly preferred embodiment, the present invention relates to a computer-implemented method for classification of a breast picture, in particular a mammogram, to be analyzed, by attribution of a BI-RADS grade thereto, comprising:
a) determining the distance between the breast picture, in particular the mammogram, to be analyzed and breast pictures, in particular mammograms, from a database of BI-RADS graded breast pictures, in particular mammograms (step 110);
b) selecting from within the database of BI-RADS graded breast pictures, in particular mammograms, a predetermined number of the closest neighboring breast picture, in particular mammograms, or neighboring breast pictures, in particular mammograms, which are at a distance from the breast picture to be analyzed below a threshold (step 120);
c) determining the mean of the BI-RADS grades of the selected neighboring breast pictures, in particular mammograms (step 130);
d) attributing the mean BI-RADS grade to the breast picture, in particular the mammogram, to be analyzed (step 140); and
e) displaying the mean grade attributed to the breast picture, in particular the mammogram, to be analyzed on an output device (step 150).

DETAILED DESCRIPTION OF THE INVENTION

Figure 1:
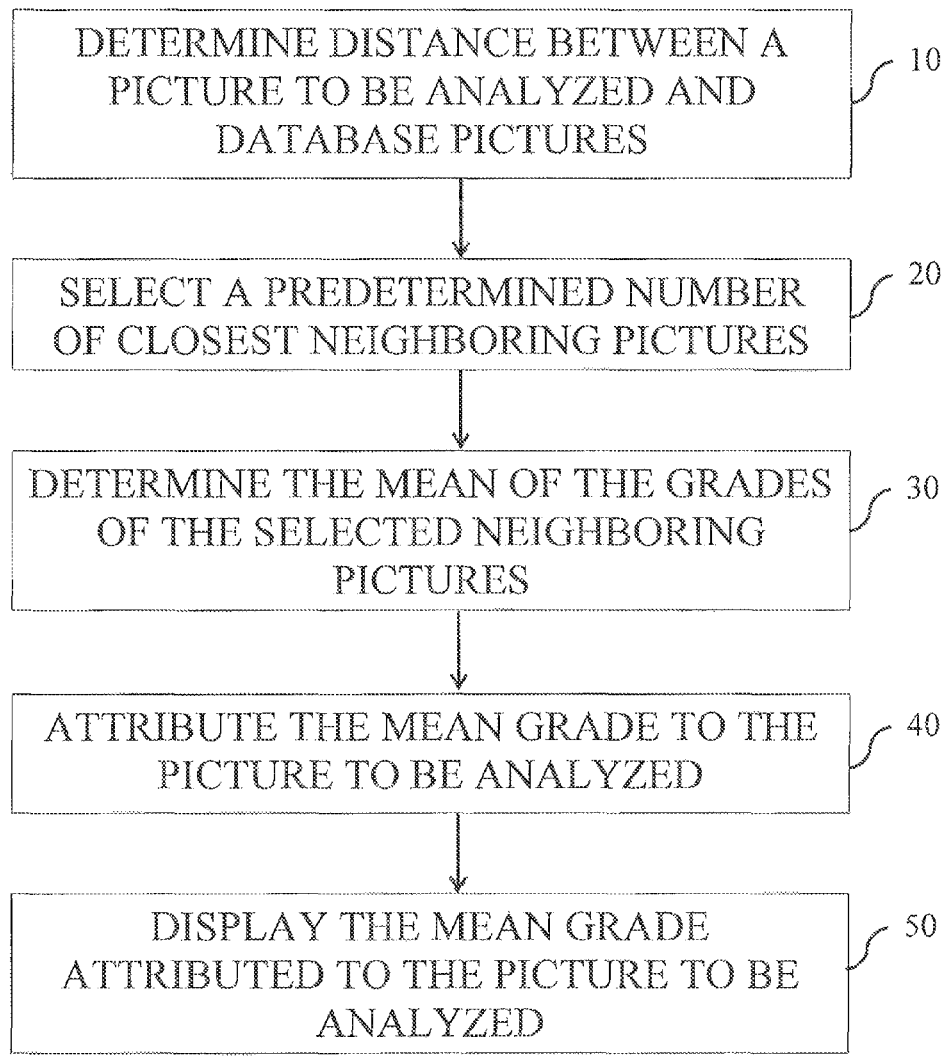
FIG. 1 is a flowchart showing an exemplary implementation of a method of the present invention.
Figure 2:
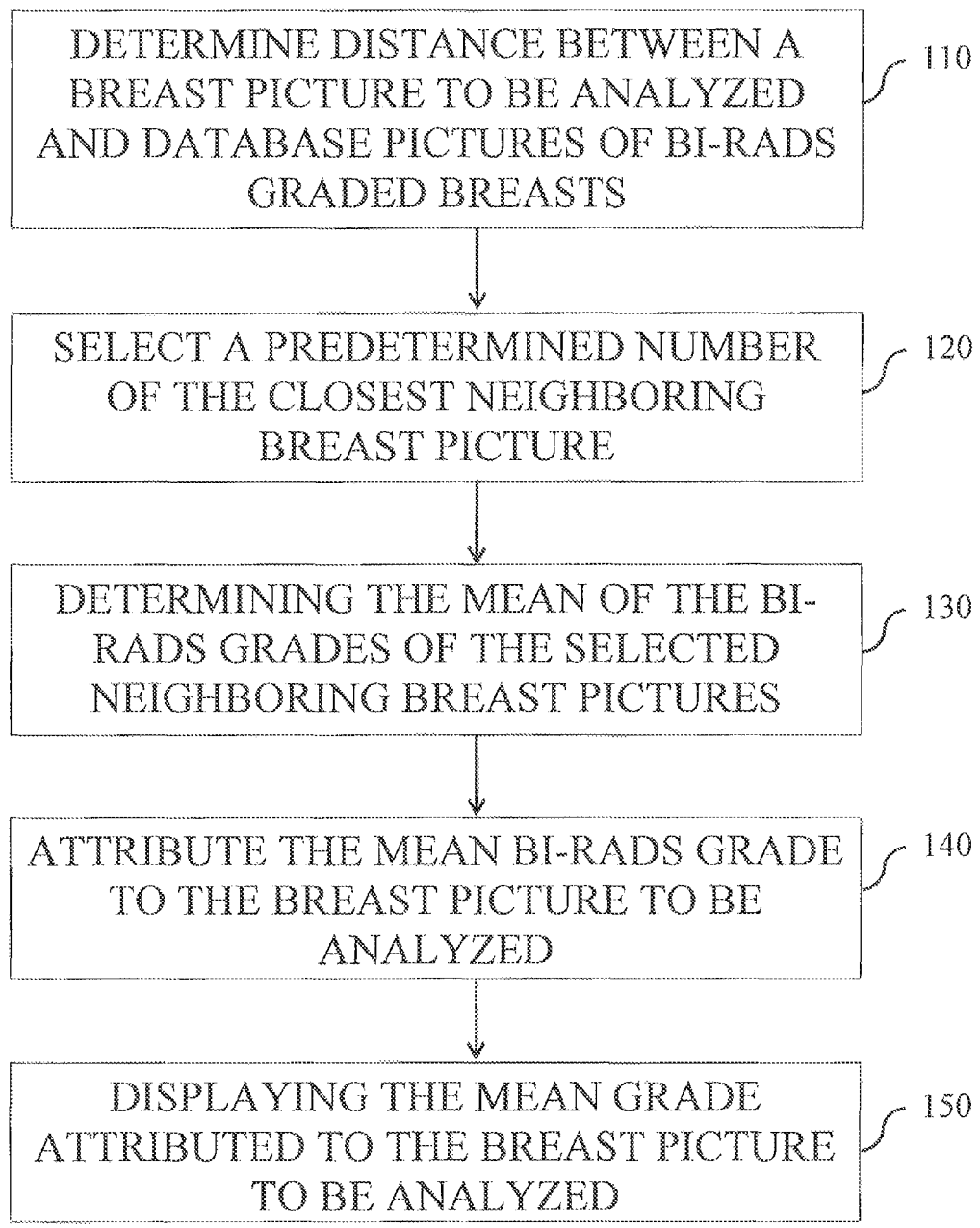
FIG. 2 is a flowchart showing another exemplary implementation of a method of the present invention.

As will be clear to one of skill in the art all steps a) to e) of the computer-implemented method of the invention are preferably implemented on a computer. In this regard, the picture to be analyzed will be preferably digitalized prior to implementing the computer-implemented method of the invention and will be stored in an internal memory of the computer, for instance in random access memory (RAM), in flash memory or on a hard disk drive (HDD) or stored in a distant server accessible by the computer. Similarly, the picture database comprises digitalized images and/or parameters according to the invention of graded pictures and may be stored in an internal memory of the computer or in a distant server accessible by the computer. Digitalization of a picture is well known to one of skill in the art: the digitalized picture is defined by a two-dimensional array of pixels to which are affected a grey level or a color level. The resolution of the digitalized picture depends on the number of pixels it harbors. By way of example the digitalized picture may have 1024×768 pixels. The grey level usually varies from 0 (black) to 255 (white) for 8-bit digitalized pictures or from 0 (black) to 65536 (white) for 16-bit digitalized pictures. Color is defined by a triplet of Red, Green and Blue (RGB) intensities which each vary from 0 to 255 for 24-bit color pictures. Preferably, the digitalized picture according to the invention is in grey levels.

As intended herein the "output device" relates to any device liable to inform the user of the computer-implemented method of the invention of the grade attributed to the picture to be analyzed. The output device may notably be a terminal display, a computer display or a printer.

In a preferred embodiment of the invention, the computer-implemented method of the invention comprises a step of displaying at least one of the selected neighboring pictures and optionally of the grade associated thereto on an output device. Such an embodiment is useful to help the operator of the computer-implemented method of the invention validate the grade attributed to the picture to be analyzed by the method of the invention.

In this regard, it should be noted that the grades according to the invention may either be continuous, e.g. continuously varying from 1 to 4, or discontinuous, e.g. be selected from the integers 1, 2, 3 and 4. As intended herein, it is preferred that the grade according to the invention is a numerical value which is assigned to a picture according to a classification key, such as a pathological status of the subject of the picture or breast density in case of a breast picture.

Besides, in another preferred embodiment of the computer-implemented method of the invention, the mean grade attributed to the picture to be analyzed is confirmed by a human operator. Indeed, the computer-implemented method of the invention may be used to only assist a human operator in classifying or grading a picture; in such a frame the grade attributed to the picture to be analyzed by the computer-implemented method of the invention should only be considered as a proposed grade.

In a preferred embodiment of the computer-implemented method of the invention, the pictures of the database have been respectively graded by at least one human operator and it is of course preferred that the human operator, or human classifying reader, is experienced in this regard. By way of example, where the pictures are mammograms, it is preferred that each mammogram of the database has been graded by one or several experienced radiologists. Preferably, the picture database according to the invention comprises at least 1000 graded pictures, more preferably at least 10000 graded pictures. By way of example of a graded picture database according to the invention, it is possible to use the following URL: http://marathon.csee.usf.edu/Mammography/Database.html which links to a database comprising about 2500 graded mammograms.

Numerous methods are known in the art to determine the distance, i.e. the similarity or the closeness, between pictures.

The distance may be calculated globally by specialized distance determination algorithms. Thus, by way of example, the distance according to the invention can be the Hausdorff distance, well known to one of skilled in the art of digitalized picture treatment.

The distance according to the invention may also be calculated pixel by pixel. In that case the distance is based on the difference between values, such as grey level or texture feature, attributed to the pixels of the picture to be analyzed and the graded pictures of the picture database, for instance by applying the Manhattan distance, the Euclidian distance or more generally the Minkowski distance. The texture feature of a pixel is well known to one of skill in the art and has notably been defined by Haralick (1979) *Proc. IEEE* 67:786-804 and can be determined as described by Haberle et al. (2012) *Breast Cancer Research* 14:R59. By way of example, the Manhattan distance between the grey level of the pixels of the pictures can be determined by summing the absolute values of the differences between the grey levels of each pixel of the picture to be analyzed and respectively the grey levels of each corresponding pixel (i.e. the pixel having the same coordinates) of the graded pictures of the picture database. In that case, the two pictures should have the same dimension and resolution. Besides, it is preferred that one of the two pictures is deformed to be superimposable to the other picture.

The distance according to the invention may also be determined by subtracting the value of a parameter of the picture to be analyzed from the value of the same parameter of the graded pictures of the picture database. The parameters of the pictures of the invention may be of any type. Parameters of the graded pictures of the database may be pre-determined prior to the implementation of the computer-implemented method of the invention. Preferably, where the pictures according to the invention are defined by a plurality of parameters, the distance according to the invention is not a Mahalanobis distance.

Besides, the distance according to the invention may be obtained by combining a plurality of distance measurements, optionally weighted, obtained by different determination methods, for instance as described above. Thus, the distance according to the invention may be the sum, optionally weighted, of at least one distance determined by a specialized distance algorithm, at least one distance determined by difference between values, such as grey level or texture feature, attributed to the pixels of the picture to be analyzed and the graded pictures of the picture database, and at least one distance determined by subtracting the value of a parameter of the picture to be analyzed from the value of the same parameter of the graded pictures of the picture database. In other words, the distance according to the invention may be a Minkowski distance obtained by summing distance parameters respectively yielded by applying various distance measurements methods.

Besides, where the pictures of the invention are breast pictures, in particular mammograms, the distance according to the invention is preferably calculated for the breast pictures, in particular mammograms, as a whole, and not for only a part of the breast pictures, in particular mammograms, such as mammographic masses.

In the frame of the present invention, it is preferred that a the predetermined number of neighboring graded pictures is, e.g. 2, 5, 10, 50, 100, or that the threshold distance is defined such that a fixed number, e.g. 2, 5, 10, 50, 100, of neighboring pictures is selected. Where more than one neighboring pictures are at the same distance from the picture to be analyzed thereby preventing reaching the fixed number of neighboring pictures—for instance 102 pictures rather than 100 pictures are below the threshold distance with the 5 farthest neighboring picture being at the same distance from the picture to be analyzed—then the pictures to be excluded are random selected among the farthest neighboring pictures.

It is particularly preferred, in the frame of the computer-implemented method of the invention that the picture to be analyzed is the picture of an organ or of a body part of an individual and the database pictures are pictures of the same organ or body part from a group of individuals.

In a preferred embodiment of the computer-implemented method of the invention, two or more pictures of a same organ or body part of an individual, which respectively represent two or more different views of the same organ or body part of the individual, are analyzed, and the database pictures also represent analogous two or more different views of the same organ or body part from a group of individuals, and wherein all the pictures of the database representing different views from a same organ or body part from a same individual have a same grade. In this regard, it is preferred that:

determining for each view to be analyzed the distance from analogous views of the database;

summing the distances obtained at the previous step for each two or more views of the database from a same individual to obtain a cumulated distance;

selecting neighboring views for a same individual of the database which cumulative distance obtained at the previous step is below a threshold distance;

determining the mean of the grades of the selected neighboring views;

attributing the mean grade to the two or more views to be analyzed; and displaying the mean grade attributed to the two or more views to be analyzed on an output device.

The pictures according to the invention may be obtained by any technical means. However, it preferred that the pictures according to the invention are X-ray pictures (i.e. radiographs), magnetic resonance imaging (RMI) pictures, sonography pictures (i.e. ultrasound pictures), or tomosynthesis pictures of an organ.

Preferably, the pictures of the invention are breast pictures, in particular breast X-ray pictures or radiographs, i.e. mammograms. In this regard, it is particularly preferred that the pictures are graded in accordance with the BI-RADS classification. In the frame of the invention the BI-RADS classification may relate to the degree of malignancy and is graded from 0 to 6, or to breast density and is graded from 1 to 4. However, it is more particularly preferred that the BI-RADS classification according to the invention relates to BI-RADS density classification (i.e. 1: Almost entirely fatty (i.e. non dense), 2: Scattered fibroglandular densities, 3: Heterogeously dense, 4: Extremely dense). As should be clear to one of skill in the art, where the BI-RADS classification, in particular the BI-RADS density classification, is used according to the invention, the mammogram as a whole is usually graded, i.e. the grade does not usually relate to only a part of the mammogram, such as a mammographic mass.

Preferably, where the pictures are breast pictures, parameters according to the invention are preferably selected from the group consisting of dense area, dense volume, breast area or volume, percent density, in particular 2D percent density or 3D percent density, mean density, presence of dense inclusions, presence of masses, area of masses, presence of calcifications, area of calcification, fractal dimension in particular where the picture are breast X-ray pictures (i.e. radiographs), magnetic resonance imaging (RMI) pictures, sonography pictures (i.e. ultrasound pictures), or tomosynthesis pictures, and more particularly mammograms.

All these parameters and their determination are well known to one of skill in the art.

Dense area is a two-dimension (2D) determination of the area, usually expressed in $cm^2$, considered as dense, which correspond to fibroglandular tissues, on a mammogram.

Dense volume is a three-dimension (3D) determination of the volume, usually in $cm^3$, considered as dense, which correspond to fibroglandular tissues, on a mammogram. The volume is generally computer-reconstructed from the 2D mammogram.

Breast area or volume relates to the 2D determination of the area of the breast or to the 3D determination of the breast.

Percent density, may relate to 2D percent density (dense area/total breast area) or to 3D percent density (dense volume/total breast volume).

Mean density may be calculated by computer-averaging pixel by pixel the gray levels of a digitalized mammogram.

The presence of dense inclusions, the presence of masses and the presence of calcifications parameters may have two values, e.g. depending on the coding system 0 and 1, or true and false. The area of masses and calcifications are usually determined in $cm^2$. One of skill in the art can readily identify dense inclusions, masses and calcifications.

Fractal dimension can be determined as described by Georgsson et al. (2007) *Image Analysis* 4522:92-101.

The invention will further illustrated by the following non-limiting Example.

EXAMPLE

A radiologist wishes to be assisted in classifying, or grading, according to the BI-RADS classification a mammogram which has been performed on an individual.

The mammogram is either already in digitalized form or is digitalized by the radiologist or an assistant and uploaded on a computer on which will be implemented the method of the invention. The computer may be either present in the practice of the radiologist or be accessed at distance, for example through an internet access and a terminal. The computer-implemented method of the invention then determines the distance, which may involve a plurality of distance measurements, between the mammogram to be graded and each graded mammogram of the database which comprises preferably at least 1000 graded mammograms. The computer-implemented method of the invention then selects the 100 closest neighboring mammograms, i.e. the less distant mammograms, with respect to the uploaded mammogram and determines the mean grade of these selected mammograms.

The mean grade, optionally truncated to yield an integer, is then displayed on the computer display or the terminal display, optionally next to the mammogram to be graded, and also optionally together with one or several, for instance from 3 to 10, of the closest neighbors extracted from the database associated to their respective grades.

Eventually, the radiologist decides on the grade to be attributed to the mammogram to be graded.

The invention claimed is:

1. A computer-implemented method for classification of a picture to be analyzed, by attribution of a grade thereto, comprising:
   a) determining the distance between the picture to be analyzed and pictures from a database of graded pictures;
   b) selecting from within the database of graded pictures a predetermined number of the closest neighboring pictures or neighboring pictures which are at a distance from the picture to be analyzed below a threshold;
   c) determining the mean of the grades of the selected neighboring pictures;
   d) attributing the mean grade to the picture to be analyzed; and
   e) displaying the mean grade attributed to the picture to be analyzed on an output device.

2. The method of claim 1, comprising a step of displaying at least one of the selected neighboring pictures and optionally of the grade associated thereto on an output device.

3. The method of claim 1, wherein the mean grade attributed to the picture to be analyzed is confirmed by a human operator.

4. The method of claim 1, wherein the pictures of the database have been respectively graded by at least one human operator.

5. The method of claim 1, wherein the threshold distance is defined such that a fixed number of neighboring pictures is selected.

6. The method of claim 1, wherein the picture to be analyzed is the picture of an organ or of a body part of an individual and the database pictures are pictures of the same organ or body part from a group of individuals.

7. The method of claim 6, wherein two or more pictures of a same organ or body part of an individual, which respectively represent two or more different views of the same organ or body part of the individual, are analyzed, and the database pictures also represent analogous two or more different views of the same organ or body part from a group of individuals, and wherein all the pictures of the database representing different views from a same organ or body part from a same individual have a same grade.

8. The method of claim 7, comprising:
   determining for each view to be analyzed the distance from analogous views of the database;
   summing the distances obtained at the previous step for each two or more views of the database from a same individual to obtain a cumulated distance;
   selecting neighboring views for a same individual of the database which cumulative distance obtained at the previous step is below a threshold distance;
   determining the mean of the grades of the selected neighboring views;
   attributing the mean grade to the two or more views to be analyzed; and
   displaying the mean grade attributed to the two or more views to be analyzed on an output device.

9. The method of claim 1, wherein the pictures are X-ray pictures, magnetic resonance imaging (MRI) pictures, sonography pictures, or tomosynthesis pictures of an organ.

10. The method of claim 9, wherein the organ is breast.

11. The method of claim 10, wherein the pictures are graded in accordance with the BI-RADS classification.

12. The method of claim 11, wherein the BI-RADS classification relates:
   to the degree of malignancy and is graded from 0 to 6, or
   to breast density and is graded from 1 to 4.

13. A computer-implemented method for classification of a breast picture to be analyzed, by attribution of a BI-RADS grade thereto according to claim 9, comprising:
   a) determining the distance between the breast picture to be analyzed and breast pictures from a database of BI-RADS graded breast pictures;

b) selecting from within the database of BI-RADS graded breast pictures the closest neighboring breast pictures or neighboring breast pictures which are at a distance from the breast picture to be analyzed below a threshold;

c) determining the mean of the BI-RADS grades of the selected neighboring breast pictures;

d) attributing the mean BI-RADS grade to the breast picture to be analyzed; and e) displaying the mean grade attributed to the breast picture to be analyzed on an output device.

14. The computer-implemented method of claim 13, wherein the breast picture is a mammogram.

15. The computer-implement method of claim 1, wherein the distance is determined by a specialized distance algorithm, or by difference between values, such as grey level or texture feature, attributed to the pixels of the picture to be analyzed and the graded pictures of the picture database, or by subtracting the value of a parameter of the picture to be analyzed from the value of the same parameter of the graded pictures of the picture database, or by the sum, optionally weighted of a plurality of the latter distances.

16. The computer-implemented method according to claim 15, wherein the pictures are mammograms and at least one parameter is selected from the group consisting of dense area, dense volume, breast area or volume, percent density, in particular 2D percent density or 3D percent density, mean density, presence of dense inclusions, presence of masses, area of masses, presence of calcifications, area of calcification, and fractal dimension.

* * * * *